H. C. SCHLEY.
DEVICE FOR WEANING CALVES.

No. 174,010. Patented Feb. 22, 1876.

WITNESSES:
J B Holderby
A B Canaga

INVENTOR.
Henry C. Schley
per Robt A. Lacey
ATTORNEY.

UNITED STATES PATENT OFFICE.

HENRY C. SCHLEY, OF NEWTON, KANSAS.

IMPROVEMENT IN DEVICES FOR WEANING CALVES.

Specification forming part of Letters Patent No. 174,010, dated February 22, 1876; application filed August 23, 1875.

*To all whom it may concern:*

Be it known that I, HENRY C. SCHLEY, of Newton, in the county of Harvey and State of Kansas, have invented certain new and useful Improvements in Devices for Weaning Calves; and I do hereby declare that the following is a full, clear, and exact description thereof, which will enable others skilled in the art to which it pertains to make and use the same, reference being had to the accompanying drawing, and to the letters of reference marked thereon, which form a part of this specification.

My invention relates to improvements in devices for weaning calves and other sucklings, and for preventing cows from sucking themselves. It consists in a hinged ring, which may be readily applied to the nose of the animal and locked by means of a sliding sleeve and a spring, and in a series of horizontal, lateral, and vertical spurs, arranged and operating as hereinafter shown.

Figure 1:
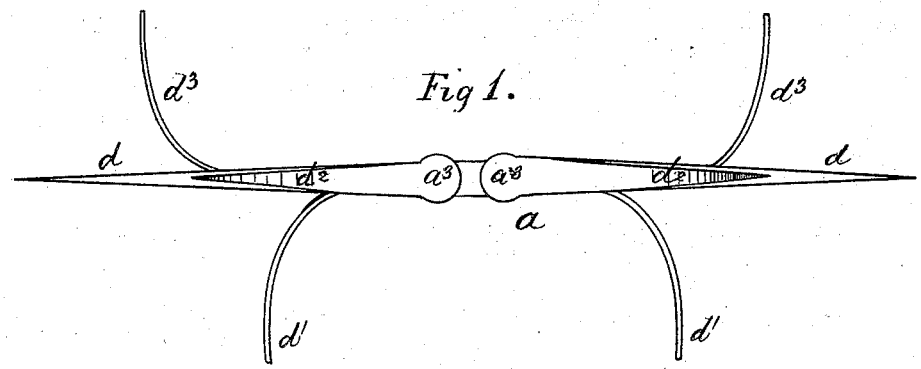
Figure 2:
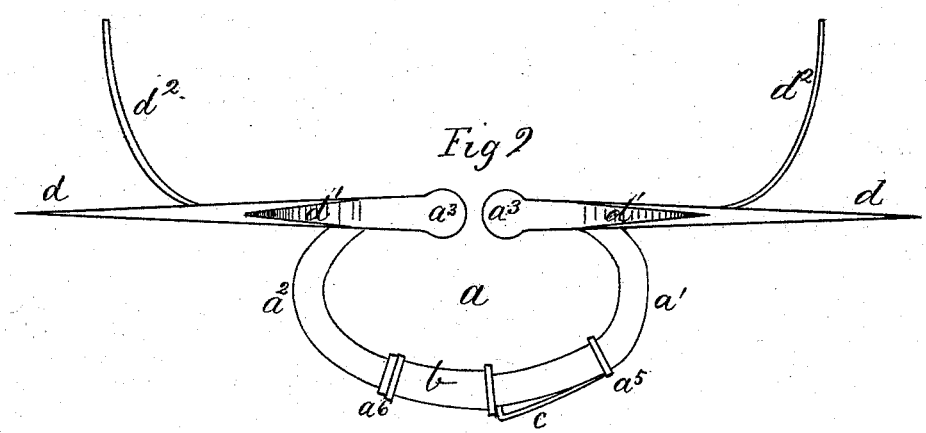
Figure 3:
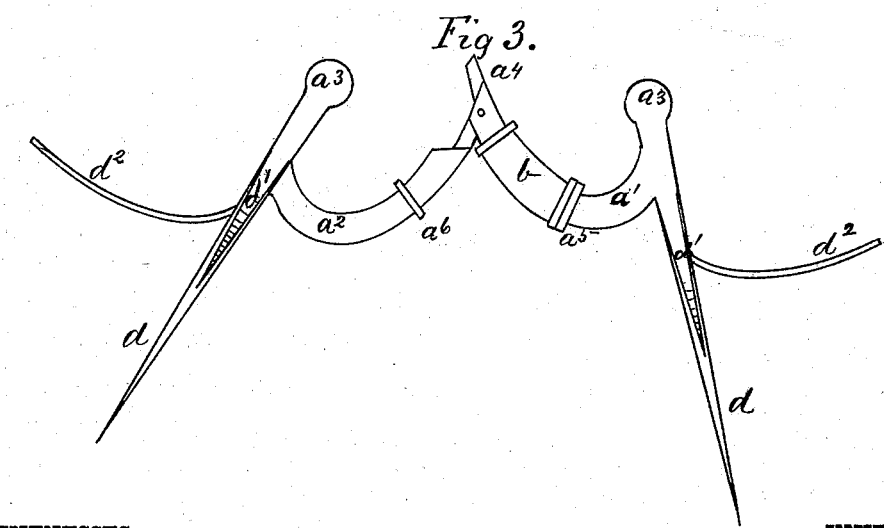

In the drawings Figure 1 is a top and Fig. 2 a side view of my device, and Fig. 3 shows the sleeve thrown back, and the ring unlocked and open.

$a$ is the nose-ring, made in two parts, $a^1$ $a^2$, and open at one side, the ends $a^3$ $a^3$ being enlarged and rounded, so as not to hurt the animal when locked on the septum of the nose. The two parts $a^1$ $a^2$ are hinged together by a suitable joint at the center $a^4$, so that they may be thrown back or open, as shown in Fig. 3. Each part of the ring is provided with a projection, $a^5$ $a^6$, which limit the movements and hold in proper place the sleeve hereinafter described. $b$ is a sleeve which fits over and slides on the ring between the projections $a^5$ $a^6$, the latter being so arranged that the sleeve can be moved, and lock or unlock the ring, as desired. $c$ is a spring-catch let into a groove in the ring. It is so constructed and arranged that when the sleeve is moved so as to lock the ring it will spring out of the groove, and will hold and prevent the sleeve from sliding back and unlocking the ring. It may be pressed down into the groove by the finger so that the sleeve will pass back over it when it is desired to unlock the ring. Attached to the ring, near the ends $a^3$ $a^3$, are a series of horizontal, lateral, and vertical spurs, $d$ $d^1$ $d^2$ $d^3$. The spurs $d$ are straight, and extend outward at a right angle to the head of the animal; and a calf in getting hold of a teat will be almost sure to stick either the leg or abdomen of the cow with one or the other of these spurs. $d^1$ are slightly curved, and project forward so as to strike the udder of the cow. $d^2$ are vertical, and will stick the abdomen, and $d^3$ curve back on either side of the nose, and will stick into the side of the head of the cow when she attempts to suck herself. It will be readily seen that the arrangement of the several spurs in my device is such that it is impossible for a calf or other suckling to get hold of the teat of the mother animal without sticking the latter with one or more of the spurs, and that a cow could not get hold of her own teat without running one or more spurs into her own flesh. It will be further seen that the device can be readily and quickly put on the nose of the animal. The ring being open, as in Fig. 3, is placed on the nose of the animal, and the sleeve pushed down over the joint $a^4$, as in Fig. 2, which locks it securely. The device when on the nose of animal does not interfere with the eating of grass or other food.

Having described my invention, what I claim, and desire to secure by Letters Patent, is—

An improved calf-weaner, consisting of the ring $a$, constructed as described, sleeve $b$, spring-catch $c$, and spurs $d$ $d^1$ $d^2$ $d^3$, all arranged and operating substantially as and for the purpose described.

In testimony that I claim the foregoing as my own I affix my signature in presence of two witnesses.

HENRY C. SCHLEY.

Witnesses:
JOHN B. DICKEY,
A. C. FREDERICK.